UNITED STATES PATENT OFFICE.

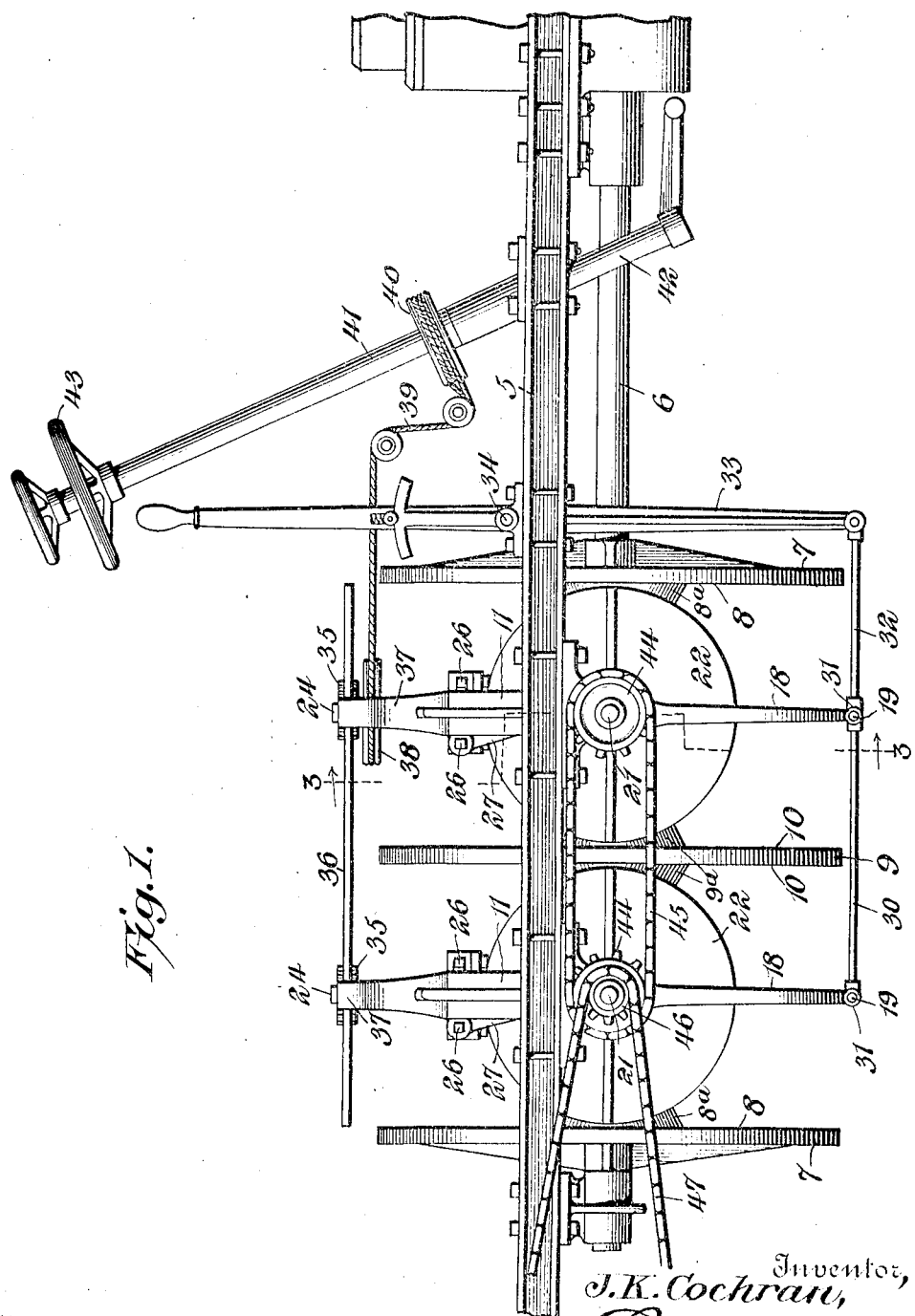

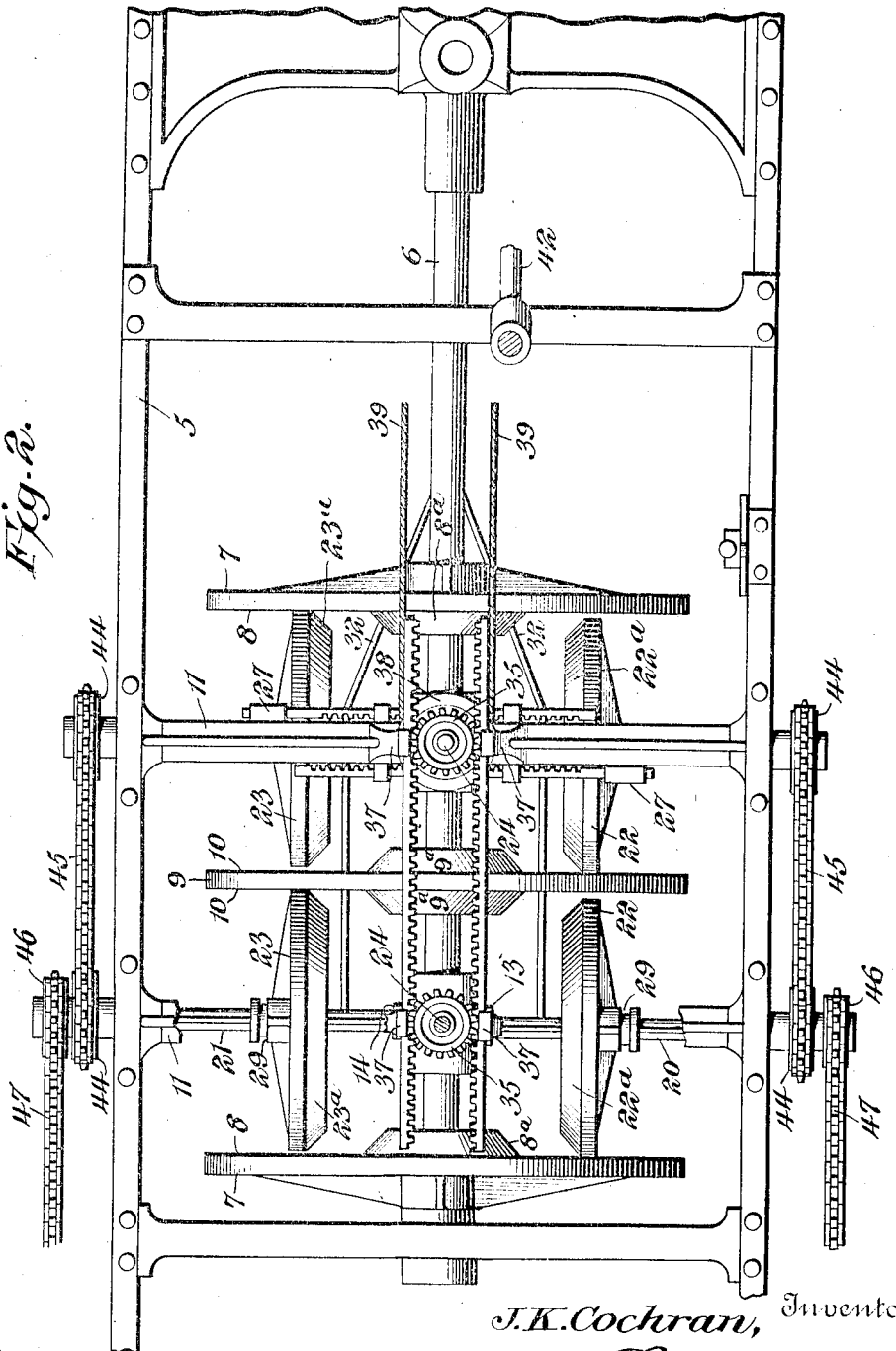

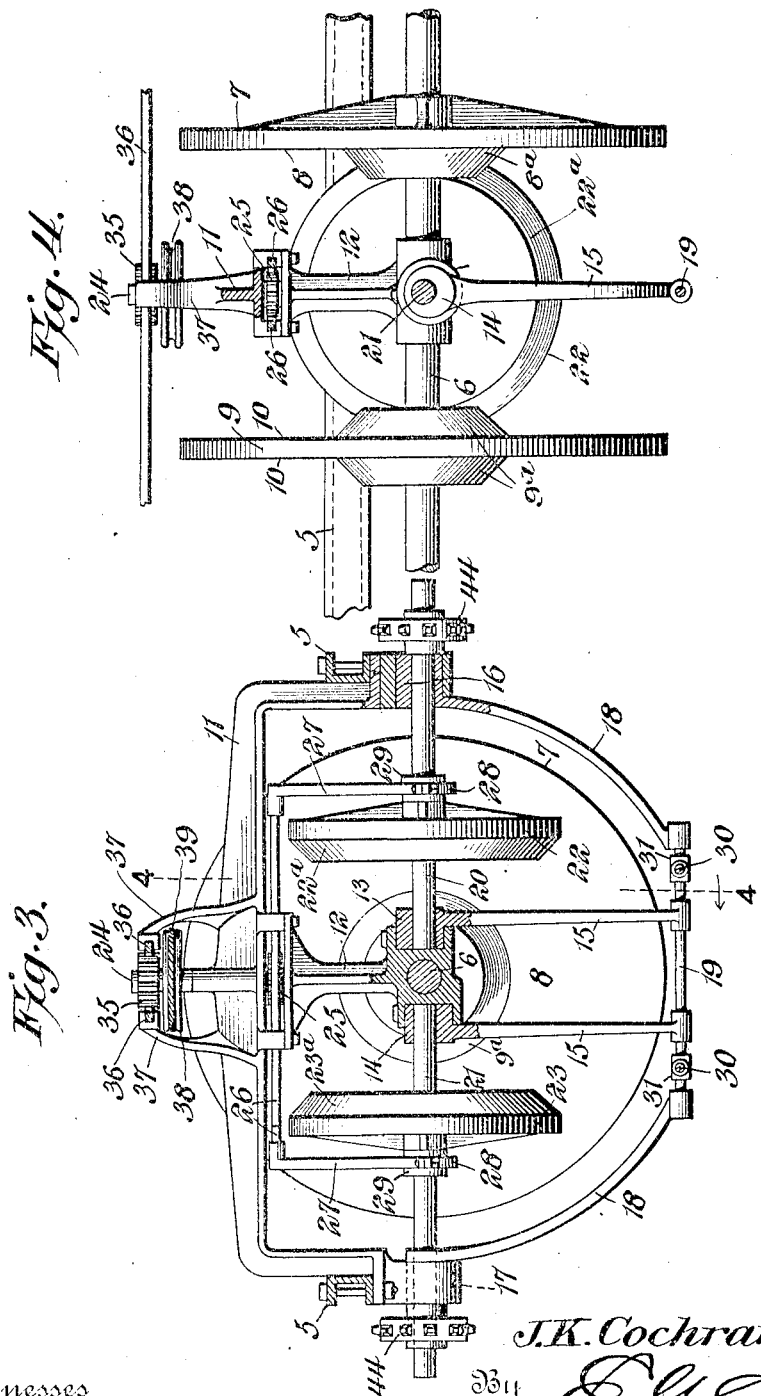

JAMES KAZLITT COCHRAN, OF CHICAGO, ILLINOIS.

FRICTION-GEARING.

No. 888,225.  Specification of Letters Patent.  Patented May 19, 1908.

Application filed December 26, 1905. Serial No. 293,370.

*To all whom it may concern:*

Be it known that I, JAMES KAZLITT COCHRAN, a citizen of the United States, residing at Chicago, in the county of Cook and State of Illinois, have invented a new and useful Friction-Gearing, of which the following is a specification.

This invention relates particularly to speed-changing and reversing friction gearing for automobiles, cars, or any other vehicles or apparatus where mechanism of the character can be successfully employed.

One of the objects is to provide a structure, wherein a plurality of sets of gearings are employed, and greater power can thus be transmitted, novel mechanism of a simple and effective nature being also provided for effecting the proper simultaneous changes of relation between the coöperating members, in order to effect the alteration of the rate of speed or the reversal of movement without interference or divergence of action.

A further and important object is to provide novel operating means useful in both single and plural sets of gearing, which means effects a uniform change of parts, without regard to their relation, and avoiding any binding action or undue friction, thereby reducing the wear upon the parts and the danger of breakage.

An embodiment of the invention that is at present considered preferable is illustrated in the accompanying drawings and is described in the following specification. The invention is, however, not limited to the exact structure disclosed.

In the drawings: Figure 1 is a side elevation of a mechanism embodying two sets of speed-changing and reversing gears. Fig. 2 is a top plan view of the same. Fig. 3 is a cross sectional view, taken substantially on the line 3—3 of Fig. 1. Fig. 4 is a detail longitudinal sectional view taken on the line 4—4 of Fig. 3.

Similar reference numerals designate corresponding parts in all the figures of the drawings.

In the embodiment illustrated, a suitable supporting frame 5 is employed that may be of any desired character. Extending longitudinally in this frame is an engine, power or main driving shaft 6, and fixed to the shaft is a plurality of friction members in the form of disks. Two outer disks 7 are shown, which are provided on their inner sides with friction faces 8 and beveled hub portions 8ª.

An intermediate friction member in the form of a disk 9 is located between the outer members 7 in spaced relation thereto and has friction faces 10, on its opposite sides, which faces respectively coöperate with the opposing faces of the outer disks 7, said intermediate members also having beveled hub portions 9ª. It will thus be seen that two separate sets of opposing friction faces are provided, and it may be here stated that any number of sets may be employed, as desired. Coöperating with each set of opposing faces 8 and 10 is a set of friction wheels, and as the sets are duplicates, a description of one, together with the mechanism for changing the relation thereof with respect to the friction faces, is thought to be sufficient for both.

A transverse arch bar 11, connected to the side bars of the main frame 5, extends between the opposing faces of the disk and carries a central hanger 12, in which the main driving shaft 6 is journaled. Rotatably mounted in the opposite sides of the lower end of the hanger 12 are cam bearings 13 and 14, the bearing 13 being disposed in reverse relation to the bearing 14, said bearings having depending arms 15. Journaled in the outer side bars of the main frame 5 are other cam bearings 16 and 17, the cam bearing 16 being arranged in corresponding relation to the bearing 13, and the bearing 17, in like manner, corresponding to the bearing 14. These bearings 16 and 17 also have depending arms 18, which are preferably curved inwardly. A tie rod 19 connects the lower ends of the arms 15 and 18, so that they necessarily move simultaneously.

Journaled in the cam bearings 13 and 16 is a countershaft 20, and journaled in the bearings 14 and 17 is another countershaft 21, these shafts being arranged substantially end to end. Slidably mounted on the shafts 20 and 21 and feathered thereto are friction wheels 22 and 23, that are located between the opposing friction faces 8 and 10 of the friction disks, and have annular beveled portions 22ª and 23ª. Journaled in the central portion of the arch bar 11 is an upright stub shaft 24, carrying at its lower end a pinion 25, located between the arch bar and the hanger 12. Slidably mounted on opposite sides of the pinion 25 are racks 26, which are provided with depending arms 27, carrying yokes 28, in which hub portions 29 of the friction wheels rotate.

From the above it will be apparent that, if the arms are swung in one direction, one of the friction wheels will be brought into contact with one of the friction faces and, at the same time, the other friction wheel will, in like manner, and simultaneously be brought into engagement with the other friction face. In this movement, it will be noted that both ends of each countershaft are correspondingly moved. In other words, there is no swinging action given to the shafts. Therefore, the wheels will properly engage the friction disks without regard to their positions longitudinally on the shafts and all binding action and twisting strains are consequently avoided. Thus, abnormal wear and the danger of breakage is greatly reduced. It will also be seen that, if the pinion 25 is turned in one direction or the other, the wheels will be moved toward or from each other, or, in other words, toward or from the axis of rotation of the main driving shaft, and, when in their innermost positions and the greatest amount of power is being transmitted, the beveled portions $22^a$ and $23^a$ will be engaged with the hub portions $8^a$ and $9^a$, thus more than doubling the friction surfaces in contact during heavy work.

The structure above described is clearly useful either in connection with a single set of gearing or with any number of sets. Where a plurality of sets are employed, as in the embodiment disclosed, mechanism is provided for effecting the simultaneous and accurately corresponding change of parts. To this end, the various arms of the reversely arranged sets of cam bearings are connected by links 30, having pivotal engagements, as shown at 31, with the tie rods 19, and the front tie rod has also link connections 32 with the lower end of a single actuating lever 33, fulcrumed, as shown at 34, on the frame. It will thus be apparent that, by moving this lever, all the countershafts will be simultaneously and laterally shifted in the proper directions to reverse the movement or stop the machine. The pinions for effecting the changes of distance between the coacting friction rollers and consequently the speed of the countershafts are also simultaneously movable, and for this purpose the upper ends of the stub shafts 24, carrying said pinions, are provided with gear wheels 35, and engaging the opposite sides of both gear wheels are rack bars 36, slidably held in position by any suitable means, as for instance, brackets 37, carried by the arch bar 11. The foremost stub shaft is also provided with a sheave or pulley 38, about which extends a cable or chain 39, which cable is wrapped upon another shaft or pulley 40, secured to a sleeve 41, that is rotatably mounted on the steering post 42, or other support. The sleeve 41, has a suitable actuating wheel 43 at its upper end. By rotating this wheel it will be apparent that through the connecting cable or chain, sheaves, rack bars and gear wheels, the pinions will be correspondingly and simultaneously rotated, thereby effecting the proper movements of the corresponding friction wheels of the different sets.

The power is transmitted from the countershafts 20 and 21 in any desirable manner. For instance, in the present embodiment, said shafts project beyond the main frame 5 and carry sprocket wheels 44, connected by sprocket chains 45. Any other suitable gearing may be employed, as desired. The rear shafts of the present structure has other sprocket wheels 46 about which pass chains 47, connected to the driven member or members.

It will be apparent from the foregoing that a structure is provided which is of comparatively great power, yet simple and practicable, said structure being of a nature that permits the change of speed or the reversal of direction without any complicated manually-operated actuating means. Furthermore, the parts and the movements due to the arrangement thereof are such that there is no danger of abnormal wear and little chance of derangement or breakage.

From the foregoing it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus described my invention what I claim as new and desire to secure by Letters Patent, is:

1. In gearing of the character described, the combination with a shaft and a plurality of friction members thereon provided with a plurality of sets of friction faces, of a plurality of sets of adjustable friction wheels, one of said sets coöperating with each set of friction faces, and common actuating means for the various sets of friction wheels connected to the same for effecting their simultaneous adjustment.

2. In gearing of the character described, the combination with a shaft, of a plurality of friction members thereon provided with a plurality of sets of friction faces, a plurality of sets of adjustable friction wheels, one of said sets coöperating with each set of faces, and a single actuating device having connections with the various sets of friction wheels for effecting their simultaneous adjustment.

3. In gearing of the character described, the combination with a main driving shaft, of a plurality of friction disks mounted thereon and having a plurality of independent sets of opposing friction faces, a friction wheel located between each set of friction faces and 888,225 movable into engagement with either face of the set, and actuating means connected to the various friction wheels for effecting their simultaneous movements.

4. In gearing of the character described, the combination with a shaft, of a plurality of friction members mounted thereon and having a plurality of independent sets of opposing friction faces, a laterally movable countershaft located between each set of faces, a friction wheel mounted on each shaft and movable therewith into engagement with either face of the set, connections between the shafts for effecting their simultaneous lateral movement, and means for moving the same.

5. In gearing of the character described, the combination with a shaft, of a plurality of friction disks mounted thereon and having a plurality of separate sets of opposing friction faces, a laterally movable countershaft located between each set of faces, spaced cam bearings for each shaft, a friction wheel mounted on each shaft and movable therewith into engagement with either face of the set, connections between the various cam bearings for effecting their simultaneous movements and the corresponding lateral movement of the shafts, and means for rotating the bearings.

6. In gearing of the character described, the combination with a main shaft, of a plurality of spaced friction disks mounted thereon and having a plurality of independent sets of opposing friction faces, separate countershafts extending between the opposite portions of each set of faces, friction disks mounted on the shafts and movable therewith into contact with the opposing faces, cam bearings for the various countershafts having arms, ties connecting the arms of the countershafts that are located between each set of disks, links connecting the different devices, and an actuating lever having connections with one of the devices for effecting the simultaneous movement of all the cam bearings.

7. In gearing of the character described, the combination with a shaft, of a plurality of friction members mounted thereon and having a plurality of sets of opposing friction faces, a friction wheel coacting with the faces of each set and movable toward and from the axis of the shaft, and means for effecting the simultaneous movements towards and from the shaft of the wheels coacting with the different sets of friction faces.

8. In gearing of the character described, the combination with a shaft, of a plurality of friction members mounted thereon and having a plurality of separate sets of opposing friction faces, a countershaft located between each set, a friction wheel feathered on each shaft, said wheel coacting with the faces of the set and movable on the shaft toward and from the axis of the first mentioned shaft, and means connected to the wheels of the different sets for effecting their simultaneous movements toward and from said axis.

9. In gearing of the character described, the combination with a shaft, of a plurality of friction members mounted thereon and having a plurality of sets of opposing friction faces, separate countershafts journaled between each set of faces, a friction wheel feathered on each shaft, said friction wheel coacting with the faces of the sets between which it is located and being movable toward and from the axis of the shaft, spaced upright stub shafts, pinions thereon, racks engaging the opposite sides of the different pinions and having yokes engaging the wheels, gearing connecting the stub shafts to effect their simultaneous movements, and actuating means for said stub shafts.

10. In gearing of the character described, the combination with a main driving shaft, of a plurality of spaced friction wheels fixed thereto and having a plurality of separate sets of opposing friction faces, separate countershafts located between each set of faces, friction wheels feathered on the different countershafts and movable toward and from the main driving shaft, said friction wheels coöperating with the faces between which they are located, gear connections between the corresponding countershafts of the different sets, cam bearings for the various countershafts having arms, a single actuating device for turning the cam bearings, connections between the actuating device and the various arms, spaced pinions, one of said pinions being provided for each set of friction wheels, racks engaging the opposite sides of the pinions, and having connections with the respective sets of wheels, connections between the pinions for effecting their simultaneous rotation, and a single actuating device for moving both pinions.

11. In gearing of the character described, the combination with a shaft, of spaced outer friction members mounted thereon and having friction faces on their inner sides, an intermediate friction member located between and in spaced relation to the outer members, said intermediate member having friction faces on its opposite sides, friction wheels located between the intermediate and outer members, and means for moving the different wheels toward and from the shaft and into and out of coaction with the surfaces of the intermediate and outer members.

12. In gearing of the character described, the combination with spaced friction members having opposed friction faces, of a countershaft extending between the members, spaced cam bearings for the shaft, means for simultaneously turning the bearings to effect the lateral movement of the shaft, and a friction wheel mounted on the shaft and movable into coaction with either friction face upon the lateral movement of said shaft.

13. In gearing of the character described, the combination with spaced friction members, having opposed friction faces, of a countershaft extending between the members, spaced cam bearings for the shaft, said bearings having arms, an actuating device connected to the arms for effecting the simultaneous rotation of the bearings, and a friction wheel mounted on the shaft and movable into coaction with either friction face upon the lateral movement of the shaft.

14. In gearing of the character described, the combination with spaced friction members having opposed friction faces, of separate countershafts located substantially in the same plane and extending between the members, spaced cam bearings for each shaft, the bearings for the different shafts being disposed in reversed relation so that the corresponding rotation of the bearings will effect the lateral movement of the shaft in opposite directions, an actuating device, connections between the device and the oppositely disposed spaced cams, and friction wheels mounted on the shafts and movable laterally in opposite directions and into engagement with the opposite faces upon the movement of the actuating device.

15. In gearing of the character described, the combination with spaced friction members having opposed friction faces, of separate countershafts located substantially in the same plane and extending between the members, spaced cam bearings for each shaft, the bearings for the different shafts being disposed in reversed relation so that the corresponding rotation of the bearings will effect the lateral movements of the shafts in opposite directions, arms carried by the bearings and extending in substantially the same direction, a tie device connecting the arms of the various bearings, an actuating lever having a link connection with the tie device, and friction wheels mounted on the countershafts and movable in opposite directions into coaction with the opposing friction faces when the lever is operated.

16. In gearing of the character described, the combination with spaced friction members having opposed friction faces, of a countershaft extending between the members, spaced bearings for the shaft, means for simultaneously moving the bearings to effect an equal lateral movement to the shaft throughout its length, and a friction wheel mounted on the shaft and movable into coaction with either friction face upon the lateral movement of said shaft.

17. The combination with a driving shaft, of three or more driving friction wheels rigidly secured thereon, transmitting friction wheels journaled between each pair of driving friction wheels and adapted for engagement with either the front or the rear driving friction wheel, and means adjusting the transmitting friction wheels radially of the driving friction wheels.

18. The combination with a driving shaft, of three or more driving friction wheels rigidly secured thereon, transmitting friction wheels journaled between each pair of driving friction wheels and adapted for engagement with either the front or the rear driving friction wheel, means adjusting the transmitting friction wheels radially of the driving friction wheels, and means transmitting friction wheels into engagement with either adjacent driving friction wheel.

19. A device of the class described embracing the combination with a driving shaft, of three or more driving friction wheels rigidly secured thereon, transmitting friction wheels journaled transversely of the driving friction wheels in balanced pairs between the same and adapted to engage oppositely on the driving friction wheels, and means adjusting the transmitting friction wheels relatively of the driving friction wheels.

20. A transmission mechanism of the class described embracing a shaft, a plurality of driving friction wheels thereon affording pairs of friction faces, transmitting friction wheels between the driving friction wheels, one on each side of the driving shaft and adapted to engage either driving friction wheel, means adjusting the transmitting friction wheels radially of the driving friction wheel, and means adjusting the same so that each driving friction wheel is engaged by two transmitting friction wheels, and means reversing the transmitting friction wheels.

21. In a machine of the class described, the combination with a driving shaft, of three or more driving friction wheels rigidly engaged thereon and affording adjacent friction faces, transmitting friction wheels journaled between each pair of said driving friction wheels and adapted for engagement with either, means shifting the transmitting friction wheels into engagement with either adjacent driving friction wheel to reverse the drive, and means shifting the same radially of the driving friction wheels.

22. In a double rolling traction power-transmitting mechanism, the combination of a shaft and two parallel disks thereon having confronting friction faces, two transverse shafts between and parallel with said disk faces, a roller on each of said transverse shafts disposed respectively on opposite sides of the center of rotation of said disks, and roller engaging and disengaging means operating to move said transverse shafts bodily and laterally in opposite directions at right angles to said disks to maintain the parallelism of the said transverse shafts and disk faces.

23. In a double rolling power transmitting mechanism, the combination of a shaft, two parallel disks thereon having confronting friction faces, two transverse shafts between and parallel with said disk faces, a roller on each of said transverse shafts disposed respectively on opposite sides of the center of rotation of said disks, roller engaging and disengaging means operating to move said transverse shafts bodily and laterally in opposite directions at right angles to said disks to maintain the parallelism of the said transverse shafts and disk faces, and drive wheels on the outer end portions of said transverse shafts.

24. In a double rolling power transmitting mechanism, the combination of a shaft, two parallel disks thereon having confronting friction-faces, two transverse shafts between and parallel with said disk faces, a roller on each of said transverse shafts disposed respectively on opposite sides of the center of rotation of said disks, roller engaging and disengaging means operating to move said transverse shafts bodily and laterally in opposite directions at right angles to said disks to maintain the parallelism of the said transverse shafts and disk faces, and means for sliding said rollers simultaneously in opposite directions on their shafts.

In testimony, that I claim the foregoing as my own, I have hereto affixed my signature in the presence of two witnesses.

JAMES KAZLITT COCHRAN.

Witnesses:
HENRY W. WILKEN,
GEORGE FISHER.